Nov. 1, 1932.　　　　G. FAST　　　　1,885,516
BRAKE AND CLUTCH CONSTRUCTION
Filed Feb. 4, 1930　　2 Sheets-Sheet 1
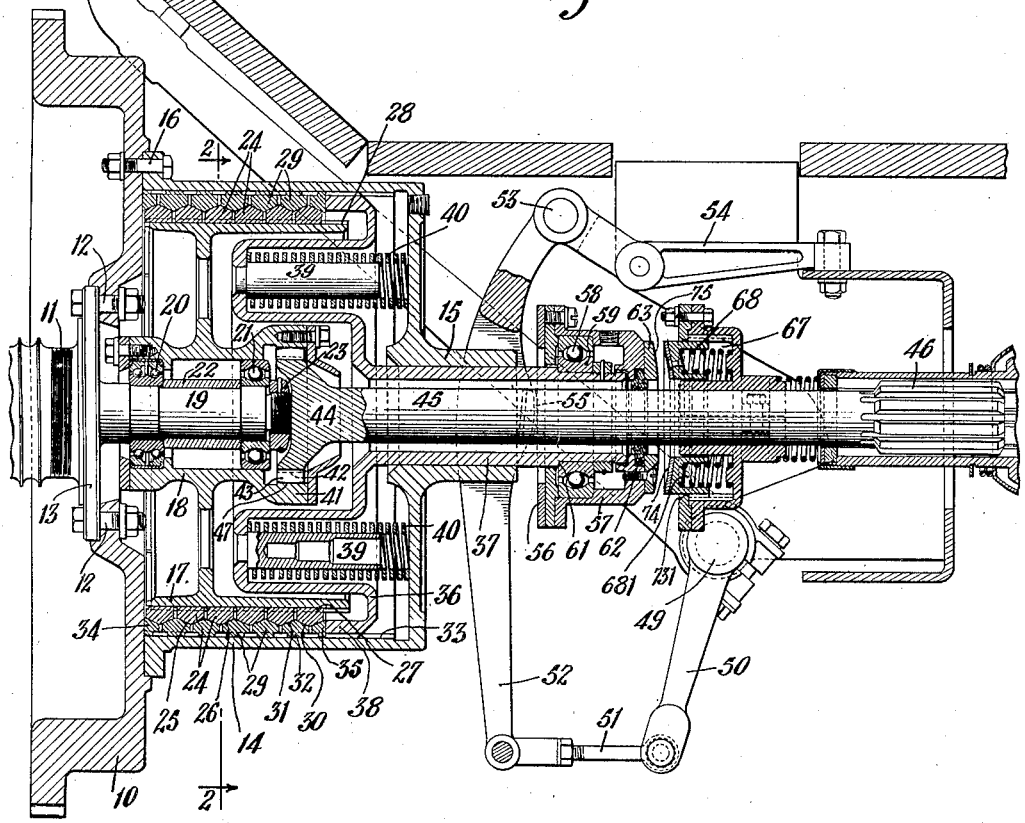
INVENTOR
Gustave Fast
BY
ATTORNEY Nov. 1, 1932.  G. FAST  1,885,516
BRAKE AND CLUTCH CONSTRUCTION
Filed Feb. 4, 1930  2 Sheets-Sheet 2
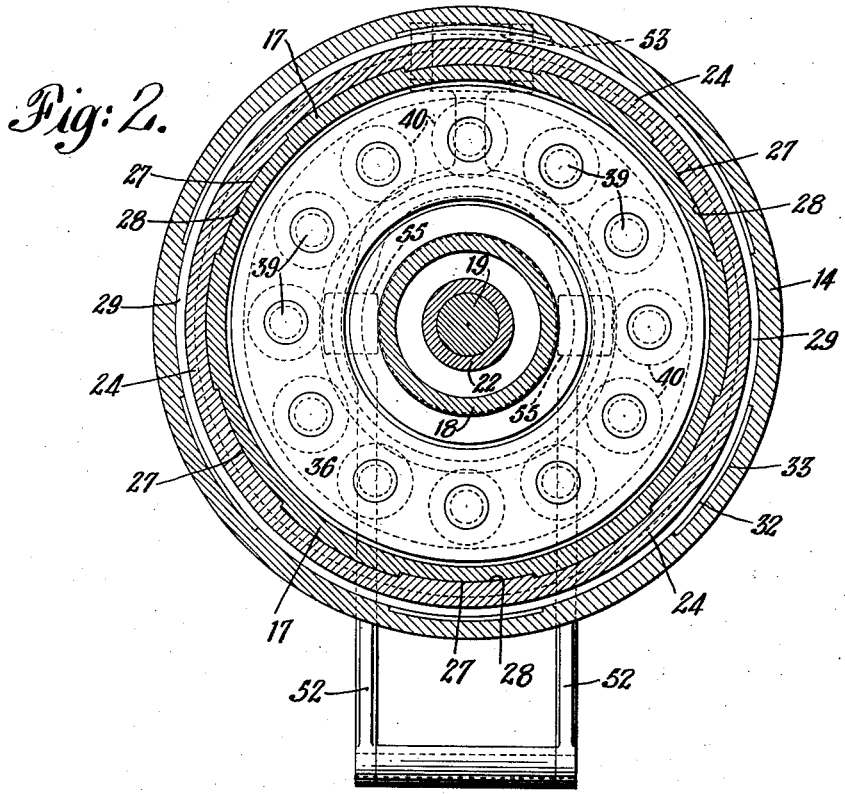
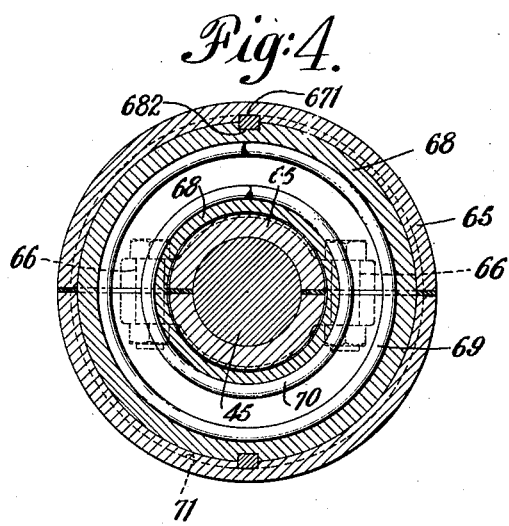
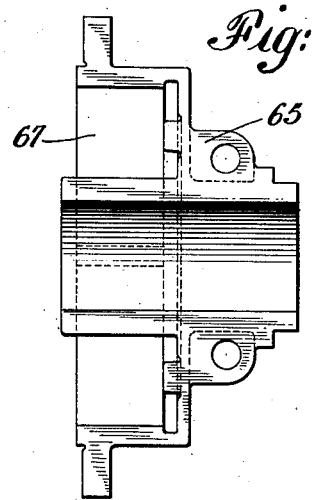
INVENTOR
Gustave Fast
BY
ATTORNEY Patented Nov. 1, 1932

1,885,516

UNITED STATES PATENT OFFICE

GUSTAVE FAST, OF ANNAPOLIS, MARYLAND, ASSIGNOR TO GUSTAVE FAST ENGINEERING CORPORATION, OF ANNAPOLIS, MARYLAND, A CORPORATION OF MARYLAND

BRAKE AND CLUTCH CONSTRUCTION

Application filed February 4, 1930. Serial No. 425,757.

This invention relates primarily to improvements in braking devices, particularly mechanisms of this sort which are adapted to be co-ordinated in operation and function with a clutch and the means for controlling the latter. The features of the present invention are especially applicable to automobiles since it is particularly desirable, in machines of this type, to co-ordinate the operations of the clutching devices, which serve to connect together the driving and driven members, with the means for applying a braking action to the driven member. The braking function co-ordinated in this way with the operation of the clutch is desirable in automobiles for the purpose of permitting the gears in the transmission mechanism, to be shifted without undue clashing of the teeth.

An important object of the invention has been to improve the construction and operation of braking devices in general and more particularly those suited for and adapted to systems of the type above specified without unduly complicating the structure. A feature in connection with this phase of the invention is the provision of an adjustable or variable braking mechanism which may be set and adapted to provide a desired braking effect under the control of a lever or other mechanism which may be given a constant or invariable movement in the course of operation.

Another object of the invention has been to improve generally the combination of a braking system, such as mentioned, with a clutch-operating mechanism and with a friction clutch which is especially suited to the performance of the desired functions.

Other objects and advantages of the invention will appear from the detailed description of one admirable embodiment thereof which will now be given in conjunction with the accompanying drawings, in which:

Figure 1 is a vertical sectional view taken longitudinally through the clutching and braking mechanism.

Figure 2 is a sectional view of the clutching devices taken along the line 2—2 of Figure 1.

Figure 3 is an enlarged sectional view of the brake system with the parts shown in their shifted or braking positions.

Figure 4 is an enlarged sectional view of the brake mechanism taken along the line 4—4 of Figure 3.

Figure 5 is a face view of one-half of one of the members of the brake mechanism.

While the invention is disclosed herein as applied to an automobile, in the train of mechanism employed for the transmission of power from the crank shaft to the gear shifting or speed changing mechanism, it should be understood that the various features of the invention are capable of broader application. Certain phases of the invention, such as the novel braking system, are obviously applicable to machines of other types and the combination as a whole, with a slight modification, may be applied to other uses. The frictional clutch disclosed herein contains many novel features capable of wide use and these are being claimed in my pending application Ser. No. 425,758, filed February 4, 1930.

Referring now to the drawings, there is disclosed a fly-wheel 10 which is secured in any suitable way to a crank shaft 11 of the engine. The connection between these parts may, as shown, be provided by bolts 12 passing through a face-plate 13 secured to the shaft and through a portion of the adjacent wall of the fly-wheel.

On the opposite face of the fly-wheel there may be mounted a housing 14 having a horizontal extension 15 provided with an opening in line with the shaft 11. The housing may be secured to the fly-wheel in any suitable way, as by means of the bolts 16 indicated. Within the housing there may be provided a cylindrical shell 17 having its outer wall spaced some distance from the inner wall of the housing. This shell may be mounted as by means of radial arms on a central hub 18 which surrounds an extension 19 of the shaft 11. The hub 18 may be supported on the extension 19 in any convenient way, as by means of a pair of ball or roller bearings 20 and 21, as indicated in Figure 1. These bearings may be held in suitably spaced relation by means of a spacing collar or sleeve 22 and may be held in proper position on the extension 19 by means of a nut 23.

On the outer surface of the shell 17 there may be mounted any desired number of friction rings 24 having substantially vertical end faces and having their outer surfaces in the form of two oppositely inclined or tapered faces 25 and 26. As indicated, the surfaces 25 and 26 may advantageously be inclined about 15 or 20 degrees to the horizontal and may merge substantially at a plane passing through the mid-portion of the ring. It is to be understood, however, that the particular angle mentioned may be varied within considerable limits and it is specified merely by way of illustration. Preferably the surfaces should be at a smaller angle to the axis of the rings than to a plane which is perpendicular to such axis.

The inner surfaces of the rings 24 may be cut away at a plurality of points to provide a number of arcuate extensions 27 (Fig. 4) adapted to co-operate with grooves 28 of substantially the same width formed in the outer surface of the shell 17 (Fig. 2). In lieu of the foregoing construction, any other suitable connection may be provided, if desired, between the rings 24 and the shell 17 which will permit longitudinal movement of the rings along the surface of the shell and at the same time prevent relative angular movement between these parts.

Outside of the rings 24, and bridging the gaps between adjacent ones of the inner rings, there may be provided a series of outer rings 29 of substantially the same but inverted form in cross section, being provided with inwardly facing tapered or inclined surfaces 30 and 31 cooperating respectively with the surfaces 26 and 25 of the inner rings. These outer rings may be provided with arcuate extensions 32 adapted to fit into complementally formed grooves in the interior surface of the housing 14 so that these outer rings may be shifted longitudinally of the housing but may not partake of any substantial angular movement relative to the housing. On the outer ends of the group of rings 29 there may be provided a pair of rings 34 and 35, each of which corresponds to a half portion of one of the rings 29. One of the vertical faces of the ring 34 may be adapted to co-operate with the opposed wall of the fly-wheel 10. In a similar way one vertical wall of the ring 35 may co-operate with an annular surface formed on an element 36 which may be in the nature of a quill diaphragm and have the peculiar form indicated in the drawings. This element in cross section, as shown, consists of a series of concentric cylindrical portions joined together by annular vertical walls and is adapted as a whole to fit between and house various portions of the adjacent structure. An extension 37 of the element 36 passes through the opening in the extension 15 of the housing and preferably is supported by engagement with the latter. The outermost cylindrical portion 38 of the element is provided with arcuate projections adapted to co-operate with the grooves 33 in the inner surface of the housing so that the element and housing may have relative longitudinal movement but will turn together.

A plurality of posts 39, riveted or otherwise secured to one of the vertical walls of the element 36, may extend horizontally between a pair of the cylindrical walls of the element and may support a corresponding number of springs 40 adapted to be compressed between the inner vertical wall of the housing 14 and the vertical annular wall of the element. The series of springs 40, therefore, will serve to normally shift the element 36 toward the left, in Figure 1, so that the annular surface at the end of the portion 38 will engage the ring 35 and force the latter toward the left, thereby pressing together all of the remaining rings 24, 29 and 34. At this time the surface 31 of the ring 35 will have a camming or wedging action with respect to the surface 25 of the adjacent ring 24 so that, in addition to forcing the latter longitudinally, it will compress the latter in all directions toward the center. Due to the resilience of the material of which the ring 24 is formed, a certain amount of molecular energy will be stored in this ring as a result of the compressive force. In a similar way the resilience of the ring 35, permitting a partial expansion of this ring, under the tensile stress arising from the camming or wedging action, will serve to store up molecular energy in this ring. It will be apparent that in a similar way the longitudinal movement of the first ring 24 toward the left, in Figure 1, will set up a corresponding action between its surface 26 and the surface 30 of the adjacent outer ring and corresponding forces will be transmitted throughout and set up in all of the rings. Therefore, under normal conditions, when the springs 40 are permitted to act freely, a considerable pressure will be exerted between all of the co-operating surfaces of the friction rings so that the rotational movements of the fly-wheel 10 and housing 14 will be transmitted to the shell 17 and hub 18.

The arrangement of the co-operating surfaces 25, 26, 30 and 31 is such that the pressure forces which result in the production of friction are evenly distributed over all of these surfaces and the distorting forces acting on the rings are uniformly transmitted to all parts of the latter. In order to insure the best and most efficient results the materials of which the various rings are made should be carefully selected for their resiliency under particular types of stress. For example the rings 24 should be formed of some material which is highly resilient under compressional forces while the other rings should be highly resilient under tensile or expanding forces. It will be found advantageous, with this in veiw, to form the rings 24 of cast iron and the outer rings of forged steel. This combination of materials, furthermore, has the advantage of providing good bearing surfaces which have little or no tendency to gall or seize. Obviously, any other combination of materials, or single material having the desired characteristics, may be employed.

Any suitable connections may be provided for transmitting the rotational movements of the hub 18 to the parts to be driven. These connections may comprise a belled extension 41 of the hub provided with driving teeth or inwardly extending projections 42 adapted to co-operate with spaces between corresponding projections 43 extending radially from an enlarged portion 44 of a shaft 45. The latter extends through the central opening in the extension 37 of the member 36. Any suitable means of connection may be provided between the shaft 45 and the parts to be driven, such as the transmission mechanism of an automobile. This connection may, for example, suitably take the form of a splined extension 46 of the shaft adapted to co-operate with an internally splined or toothed portion of the driven member. In order to permit a relative rocking movement between the shaft 45 and the hub 18, the outer ends of the projections 43 may be provided with curved surfaces 47 which are in the form of arcs having their center at the point of intersection of the axis of the shaft 45 with a vertical plane passing through the middle of the projections 43. This provides a universal connection which will permit adjustment of the shaft to slight misalignments caused by unevenness in the road over which the automobile is traveling or inaccurate assembly of the parts.

Now, when it is desired to disconnect the driving and driven members, the friction rings may be released by sliding the member 36 longitudinally toward the right, in Figure 1, within the housing. This may be effected in any suitable way, as by the provision of a foot pedal mounted on an arm 48 pivotally connected to the frame of the car, as by means of a stud 49. An arm 50 formed integrally with an extension of the pedal-operated arm 48, or otherwise connected therewith, is connected by means of an extensible link 51 with a clutch shifting yoke 52. The latter is pivotally carried by the frame of the machine, as by means of a stud 53 passing through the upper end of the yoke and into a bracket 54 secured to the main frame of the machine. A pair of arcuate surfaces 55, formed on the two arms of the yoke which straddle the extensions 15 and 37, are adapted to engage the surface 56 of a housing 57 mounted on the extension 37 near its extreme right end. The arcuate form of the surfaces 55 permits the desired free movement of the latter relative to the surface 56 as the housing slides longitudinally and the yoke is rocked. A ball or roller bearing construction 58 is preferably provided between the housing 57 and the extension 37 to permit free rotation of the extension within the housing. The inner bearing ring 59 may be secured to the end of the extension 37 in any suitable way, as by means of a nut 60 which serves to clamp the bearing against a shoulder 61 formed on the extension.

It will be apparent that when the pedal 48 is depressed or moved toward the left, in Figure 1, the arm 50 will serve to draw the link 51 toward the right and rock the yoke 52 counter-clockwise so that the surfaces 55 thereof will engage the surface 56 of the housing 57 and slide the latter toward the right. This will serve to correspondingly shift the member 36 to the right and thereby compress the springs 40. As a result the pressure on the friction rings will be relieved and a portion of the molecular energy stored in these rings will become effective to bring about their instantaneous release. All of the friction surfaces are in this way disengaged or rendered ineffective substantially simultaneously. The housing 14 is preferably made oil-tight at all of its joints so that the friction rings may in part or in whole be immersed in a body of lubricant. This will bring about a highly desirable condition when the clutch is disengaged by operation of the foot pedal since the wear and resistance between the inner and outer rings, which at this time partake of relative rotary movement, will be reduced to a minimum. At the same time the lubrication will not interfere with the proper frictional engagement of the rings when the clutch is active. The annular passage between the shaft 45 and the extension 37 may be sealed off at its end by the provision of a washer 62 of any suitable material held in place by a retaining ring 63 or by the provision of a stuffing box, or the like, at this point. It will be understood, however, that while the clutch is admirably adapted to lubrication, its features may be employed, as well, in connection with a dry or non-lubricated form of clutch.

Now, in order that the driven shaft 45 may be temporarily retarded in its rotation at a time when the clutch elements are disengaged, so that the change speed-gears of the transmission mechanism may be shifted without undue clashing of the teeth, the following brake construction is provided:

A housing 65, preferably in the form of a brass casting, although other suitable material may be employed if desired, is attached to the shaft 45 in such a way as to partake of the rotational movements of the latter. The means for securing this member to the shaft, however, is preferably accessible and readily releasable so that the member may be adjusted longitudinally to any desired position. For this purpose the member may be of split construction, as best shown in Figure 4, and may be clamped to the shaft by means of suitable bolts 66. A large annular recess 67 is provided in one face of the member 65. In this recess there is slidably mounted an annular member 68, also preferably formed of brass and having a large annular cavity 681. This member acts as a piston in the annular recess. Springs 69 and 70, engaging the opposed faces at the bottoms of the recess and cavity in the members 65 and 68, serve to move the piston member outwardly until a shoulder 71 thereon is brought into co-operation with a shoulder 72 provided by a retaining ring 73 bolted or otherwise secured to the open end of the member 65. A plurality of keys may be employed in co-operation with the keyways 671 and 682 of the member 65 and 68 to prevent relative turning movement between these parts without interfering with their relative longitudinal movement.

Secured in any suitable way to the outer face of the piston member 68 is a friction surface 74 formed of any suitable material, such as asbestos fibre, and adapted to create a desired amount of friction in co-operation with the face 75 of the retaining ring 63 secured to the outer face of the clutch shifting housing 57. Ring 63 may be formed of any suitable material, such as mild steel, adapted for frictional engagement with the element 74. If desired it may be lined with material similar to that of which the element 74 is formed. The co-operating faces of the ring 63 and the element 74 are preferably arcuately formed so as to permit angling or relative adjustment of the surfaces to take care of inaccurate alignment as well as slight relative movements of the shaft 45 and the extension 37. The curvature of these surfaces may well be in the form of arcs about the same center as the surfaces 47. Furthermore, the surfaces 731 of the retaining member 73 is preferably bevelled or curved over an arc similar to that of the surface of element 74 so as to form substantially a continuation of said surface when the piston member is fully pressed into the recess 67.

As the pedal 48 is depressed and the yoke 52 is rocked to shift the housing 57 toward the right, in Figure 1, the surface 75 of the ring 63 will be brought into contact with the surface of the element 74 and create a limited amount of friction proportional to the pressure between these surfaces. At the outset this will not be very great but as the movement of the housing 57 continues, the piston member 68 will be forced inwardly against the action of the springs 69 and 70 so that a greater pressure and a correspondingly greater frictional resistance will be offered. Since the housing 57 is held against rotation when the pedal 48 is depressed by virtue of frictional contact between surface 56 and the arcuate portion 55 of clutch-yoke 52, the friction between the surfaces of the members 74 and 63 will tend to materially slow down the rotational movement of the shaft 45 so that the shifting of the gears forming part of the transmission or speed-changing mechanism may be effected without clashing of teeth. The amount of friction created between these surfaces, and correspondingly the extent to which the shaft 45 is retarded in its rotation, may be varied at will by adjusting the member 65 longitudinally along the shaft and clamping it at the desired point. If it is shifted to a greater distance toward the right, in Figure 1, the friction surfaces will not be brought together until a later period in the operation of the clutch pedal and the total force exerted between these surfaces will be somewhat less. In certain positions of the member 65 the piston member may be forced completely into the recess 67 so that the end of the piston engages the end wall of the recess before the movement of the clutch pedal is arrested. In that event the final pressure between the friction surfaces will be in proportion to the foot pressure.

However, if the member 65 is placed far enough to the right, the clutch pedal may be positively arrested, as for example by the engagement of the posts 39 with the end wall of the housing 14, before solid contact is reached between the piston 68 and member 65. The pressure between the friction surfaces will then be entirely determined by the springs 69 and 70.

Obviously, the amount of pressure between the friction faces may be varied to suit the particular requirements by employing springs 69 and 70 of any desired strength. It will be found desirable to provide sufficient, normal clearances between the surfaces of the members 74 and 63 to permit more or less complete disengagement of the clutch elements 24, 29, 34 and 35 before the brake surfaces are brought together. This can very readily be done in the construction herein disclosed in view of the nature of the frictional members of the clutch which enables a very quick release of these parts.

While one embodiment of the invention has been disclosed in considerable detail herein, it is to be understood that many variations may be made without departing from the spirit and scope of the invention. The terms employed herein are not to be taken as imposing any limitations upon the construction and scope of the invention since they are used merely for the purpose of describing one admirable form which it may assume.

What I claim is:

1. In a device of the class described a shaft, a housing secured thereto, said housing having a recess therein, an element telescopically slidable within said recess, said element having a friction face, yieldable means normally holding said element in predetermined relation in said recess, a member shiftable relatively to said housing, said member having a friction face adapted to co-operate with the friction face of said element, and means for shifting said member to force its friction face against that of the member and thereby force the latter inwardly in said recess.

2. In a device of the class described a shaft, a housing secured thereto and adjustable longitudinally thereof, said housing having a recess therein, an element slidably mounted in said recess, said element having a friction face, yieldable means normally holding said element in predetermined relation in said recess, a member shiftable relatively to said housing, said member having a friction face adapted to co-operate with the friction face of said element but normally spaced therefrom, and means for shifting said member to force its friction face against that of the member and thereby force the latter inwardly in said recess.

3. In a device of the class described a shaft, a plurality of members surrounding said shaft, one of said members being secured to said shaft and the other member having relative rotary movement with respect thereto, a friction face yieldably carried by one of said members, a co-operating friction face carried by the other of said members, said faces being arcuately formed to compensate for angular adjustment of said members, and means for producing relative longitudinal movement between said members to engage said friction faces.

4. In a device of the class described a shaft, a member secured to said shaft, a second member surrounding said shaft but mounted independently thereof, an annular recess formed in one of said members, a friction face on the other member, an annular piston slidable in said recess, said piston having an outer friction face adapted to co-operate with said first mentioned friction face, a spring opposing movement of said piston into the recess, and means for producing relative axial movement between said members to create friction between said friction faces.

5. In a device of the class described a shaft, a member secured to said shaft, a second member surrounding said shaft but mounted independently thereof, an annular recess formed in one of said members, a friction face on the other member, an annular piston slidable in said recess, said piston having an outer friction face adapted to co-operate with said first mentioned friction face, said friction faces and the face of said one member adjoining said recess being arcuately formed, a spring opposing movement of said piston into the recess, and means for producing relative axial movement between said members to create friction between said friction faces.

6. In a machine of the class described a driving member, a driven member, shiftable frictional clutch elements adapted to connect and disconnect said members, a shaft connected with said driven member, said shaft being adapted for angling movements with respect to said driven member, means for shifting said clutch elements, and co-operating brake members carried by said shaft and said shifting means, said brake members being brought into yielding engagement upon partial disengagement of said clutch elements and having arcuately formed contact surfaces to permit said angling movements.

7. In a machine of the class described a driving member, a driven member, shiftable frictional clutch elements adapted to connect and disconnect said members, a shaft connected with said driven member, said shaft being adapted for angling movements with respect to said driven member, means for shifting said clutch elements, and co-operating brake members normally disengaged and carried by said shaft and said shifting means, said brake members having arcuately formed contact surfaces to permit said angling movements, and one of said brake members being yieldably mounted on its support.

In testimony whereof, I have signed my name to this specification this 31st day of January 1930.

GUSTAVE FAST.